(12) United States Patent
Zhao et al.

(10) Patent No.: US 11,778,710 B2
(45) Date of Patent: Oct. 3, 2023

(54) LOAD SHORT-CIRCUIT PROTECTION CIRCUIT OF LED POWER SUPPLY

(71) Applicants: Self Electronics Co., Ltd., Zhejiang (CN); Wanjiong Lin, Zhejiang (CN); Self Electronics USA Corporation, Norcross, GA (US)

(72) Inventors: Pengyuan Zhao, Zhejiang (CN); Yanhai Lin, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 17/653,154

(22) Filed: Mar. 2, 2022

(65) Prior Publication Data
US 2022/0287165 A1     Sep. 8, 2022

(30) Foreign Application Priority Data
Mar. 2, 2021   (CN) .......................... 202110230473.0

(51) Int. Cl.
  *H05B 45/345*  (2020.01)
  *H05B 45/50*   (2022.01)
(52) U.S. Cl.
  CPC .......... *H05B 45/50* (2020.01); *H05B 45/345* (2020.01)

(58) Field of Classification Search
  CPC ...... H05B 45/10; H05B 45/30; H05B 45/345; H05B 45/50; H05B 47/10
  See application file for complete search history.

(56) References Cited

U.S. PATENT DOCUMENTS

2021/0227664 A1*   7/2021   Li ........................ H05B 45/385

FOREIGN PATENT DOCUMENTS

CN            208273303 U   * 12/2018

* cited by examiner

*Primary Examiner* — Jimmy T Vu
(74) *Attorney, Agent, or Firm* — Wang Law Firm, Inc.

(57) ABSTRACT

A load short-circuit protection circuit of LED power supply includes a power supply end, a load end, a switching module disposed between the power supply end and the load end, and a sampling resistor set in series with the load end, and further includes a signal amplification module that collects the current change signal of the sample resistor, and a protection control module that receives a amplification signal of the signal amplification module and controls the on-off of the switching module according to the signal. The circuit can quickly magnify the subtle voltage difference changes on the sampling resistor and output them to the protection control module. The resistance value of the sampling resistance can be set very small to reduce the loss. Meanwhile, the selected devices are simple, with very fast response speed, low cost and high stability.

3 Claims, 7 Drawing Sheets

LOAD SHORT-CIRCUIT PROTECTION CIRCUIT OF LED POWER SUPPLY

RELATED APPLICATION

This application claims priority to a Chinese Patent Application No. CN 202110230473.0, filed on Mar. 2, 2021.

FIELD OF THE TECHNOLOGY

The present invention relates to the field of LED power supply circuits, particularly a load short-circuit protection circuit of LED power supply.

BACKGROUND

At present, the LED power on the market is generally divided into two major categories of constant voltage power supply and constant current power supply. In the constant voltage power supply scheme, since the output voltage is constant, the output current changes according to the value of the load. Therefore, when the constant voltage power supply fails and causes a short circuit, the output current of the constant voltage power supply will surge in a short time. If it cannot be quickly detected to protect, it will bring damage to the power supply, even fire accidents.

In the prior art, there are two ways to perform short-circuit detection protection, one is to detect the power supply voltage, as shown in FIG. 1, when the output is short-circuited, the load is 0, the output current will far exceed the output of the power supply VCC, so the VCC voltage will be reduced. If the voltage at check point is lower than a certain threshold, the device can be determined to be short-circuited and the device can be protected. The disadvantage is that when the VCC power output is large, or the short circuit has a certain resistance value, the VCC voltage falls slowly, or even falls below the detection threshold, resulting in short circuit protection failure. The other is to detect the power supply current, as shown in FIG. 2, when the output is short-circuited, the output current will increase instantly because the load is 0, and the circuit that flows through R will increase, resulting in the voltage increase at both ends of R. It is only necessary to detect the CHECK point voltage higher than a certain threshold, can determine the device short circuit and protect the device. The disadvantage is that when a user wants to process the detected signal, whether it is a single-chip MICROCOMPUTER ADC or an operational amplifier to amplify the signal, the voltage at both ends of the sampling resistance needs to reach a certain range before it can be processed. When the power of the power supply is very high, the power of the sampling resistance is very high and the heating is serious, so it is not suitable for the short-circuit protection scheme of the high-power constant voltage power supply.

At present, there is a lack of simple structure, low energy consumption and high stability of LED power supply load short circuit protection circuit suitable for high power constant voltage power supply.

BRIEF SUMMARY THE TECHNOLOGY

In view of this, the present invention provides a load short-circuit protection circuit of an LED power supply to solve the above technical problems.

a load short-circuit protection circuit of LED power supply includes a power supply end, a load end, a switching module disposed between the power supply end and the load end, and a sampling resistor set in series with the load end, it further includes a signal amplification module that collects the current change signal of the sample resistor, and a protection control module that receives a amplification signal of the signal amplification module and controls the on-off of the switching module according to the signal.

advantageously, the signal amplification module comprises a first triode, a second triode and a constant current source, and when the sampling resistor is disposed at the upper end of the circuit, the first triode and the second triode employ a PNP type triode;

the base of the first triode is connected to the base of the second triode, the emitter of the first triode is connected to the positive electrode of the sampling resistor, the collector of the first triode is connected with the protection control module as a signal output end, the collector of the first triode is also connected to the positive electrode of the first resistor, and the negative electrode of the first resistor is grounded;

the emitter of the second triode is connected to the negative electrode of the sampling resistance, the collector is connected to the positive electrode of the constant current source, the negative electrode of the constant current source is grounded.

advantageously, the collector of the first triode is connected to a second resistor, a negative electrode of the second resistor serves as a signal output end to connect the protection control module.

advantageously, the signal amplification module comprises a first triode, a second triode and a constant current source, and when the sampling resistor is disposed at the lower end of the circuit, the first triode and the second triode employ an NPN type triode;

the base of the first triode is connected to the base of the second triode, the collector of the first triode is connected to the negative electrode of the sampling resistor, the emitter of the first triode is connected with the protection control module as a signal output end, and the emitter is also connected to a negative electrode of a conversion resistor, a positive electrode of the conversion resistor is connected to the power supply end;

the collector of the second triode is connected to the positive electrode of the sampling resistor, the emitter is connected to the negative electrode of the constant current source, and the positive electrode of the constant current source is connected to the power supply end.

The technical effects of the present invention:

The load short circuit protection circuit of the LED power supply of the present invention can quickly magnify the subtle voltage difference changes on the sampling resistor and output them to the protection control module. The resistance value of the sampling resistance can be set very small to reduce the loss. Meanwhile, the selected devices are simple, with very fast response speed, low cost and high stability.

BRIEF DESCRIPTION OF THE DRAWINGS

Embodiments of the present invention will be described below with reference to the drawings, in which.

DETAILED DESCRIPTION OF THE INVENTION

Specific embodiments of the present invention will be described in further detail below based on the drawings. It should be understood that the description of the embodiments of the present invention herein is not intended to limit the protection scope of the present invention.

Figure 1:
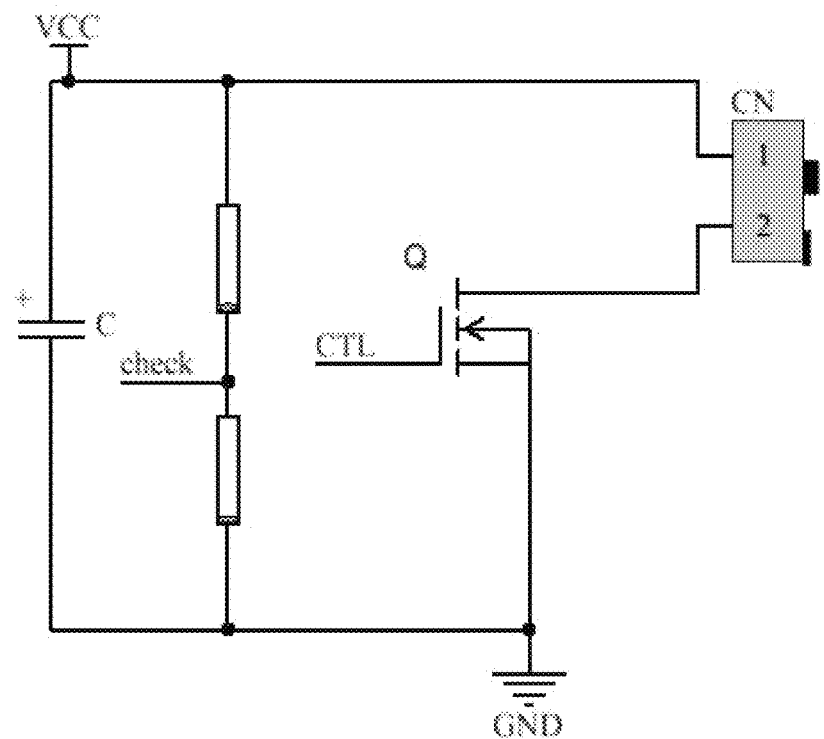
FIG. 1 is a schematic diagram of a load short-circuit protection circuit of an LED power supply of the prior art.
Figure 2:
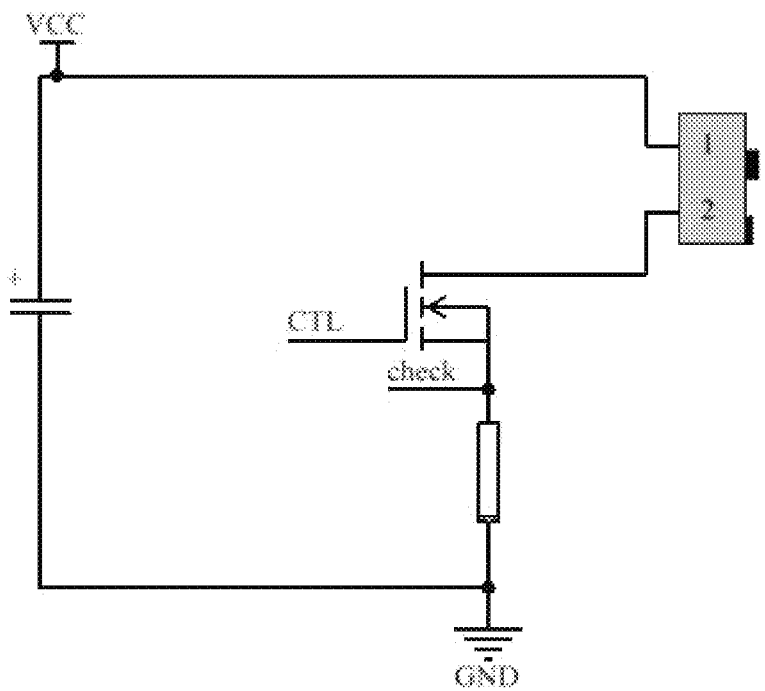
FIG. 2 is a schematic diagram of a load short-circuit protection circuit of another LED power supply of the prior art.
Figure 3:
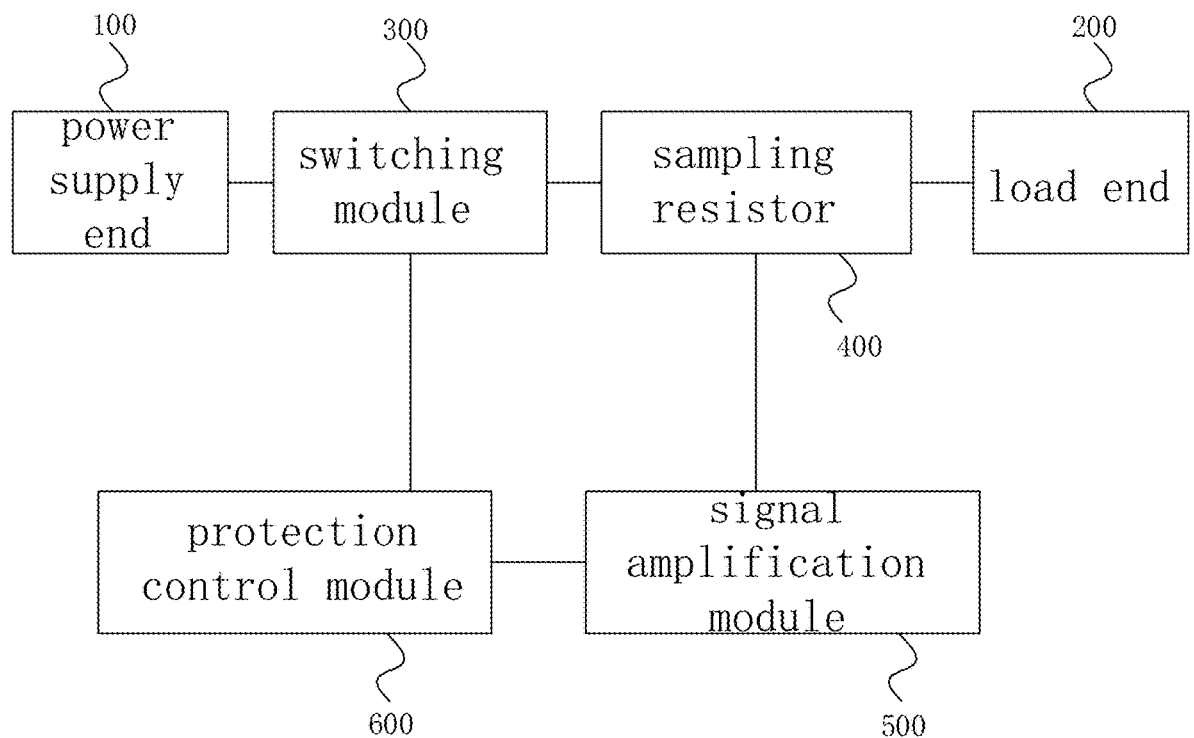
FIG. 3 is a block diagram of a load short circuit protection circuit of the LED power supply in embodiment 1.

As shown in FIG. 3, the load short-circuit protection circuit of a LED power supply of the present embodiment includes: a power supply end 100, a load end 200, a switching module 300 disposed between the power supply end 100 and the load end 200, and a sampling resistor 400 set in series with the load end 200, a signal amplification module 500 that collects the current change signal of the sample resistor 400, and a protection control module 600 that receives the amplification signal of the signal amplification module 500 and controls the on-off of the switching module 300 according to the signal.

When the load side 200 is short-circuited, the signal amplification module 500 rapidly enlarges the subtle difference in voltage change on the sampling resistor 400 and outputs it to the protection control module 600, and the protection control module 600 controls the switching module 300 to turn off, thereby disconnecting the circuit between the power supply end 100 and the load end 200, protecting the load and power supply.

The protection control module 600 can directly use microcontroller or other control chips, and can also set analog circuit to achieve control, and the switching module 300 can use triode, MOS tube, and the like, and will not be described in the prior art. In the present embodiment, the protection control module 600 adopts a microcontroller with the check pin connected with the signal amplification module 500 and the CTL pin connected to the control terminal of the switching module 300, and the switching module 300 adopts a MOS tube Q3.

Figure 4:
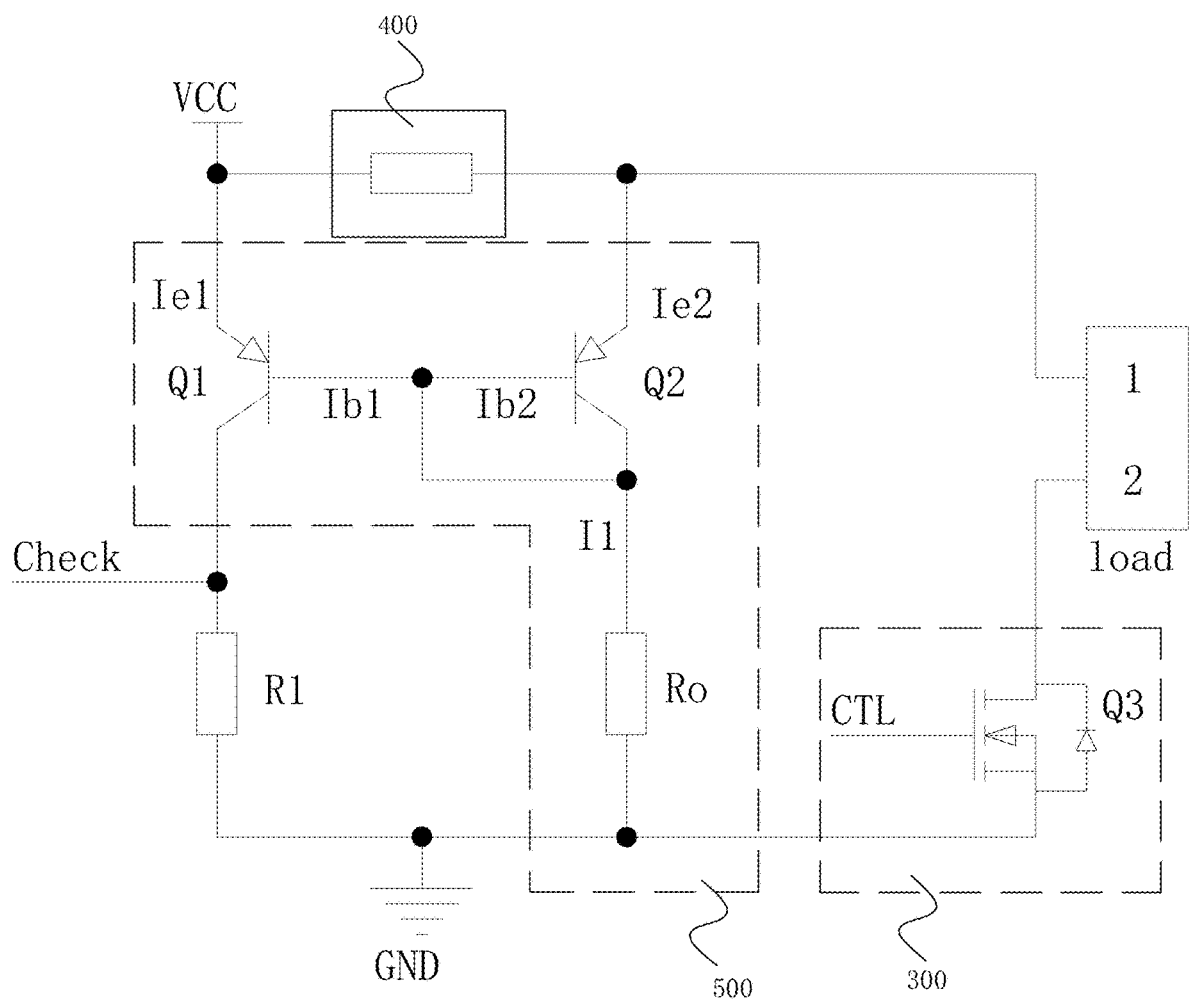
FIG. 4 is a schematic diagram of a load short circuit protection circuit of the LED power supply in embodiment 1.

The signal amplification module 500 can be set according to the setting of the sampling resistor 400. As shown in FIG. 4, the signal amplification module 500 of the present embodiment includes a first triode Q1, a second triode Q2 and a constant current source Ro. When the sampling resistor 400 is disposed at the upper end of the circuit as shown in FIG. 4, the first triode Q1 and the second triode Q2 employ a PNP type triode; The base of the first triode Q1 is connected to the base of the second triode Q2, the emitter is connected to the positive electrode of the sampling resistor 400, the collector is connected with the protection control module 600 as a signal output end, the collector is also connected to the positive electrode of the first resistor R1, the negative electrode of the first resistor R1 is grounded; The emitter of the second triode Q2 is connected to the negative electrode of the sampling resistance 400, the collector is connected to the positive electrode of the constant current source Ro, the negative electrode of the constant current source Ro is grounded.

The constant current source Ro maintains a constant current on it, which can be a resistor, or a constant current source device can also be used, and the constant current source device can be obtained by procurement, and the resistance is employed in the present embodiment.

Figure 6:
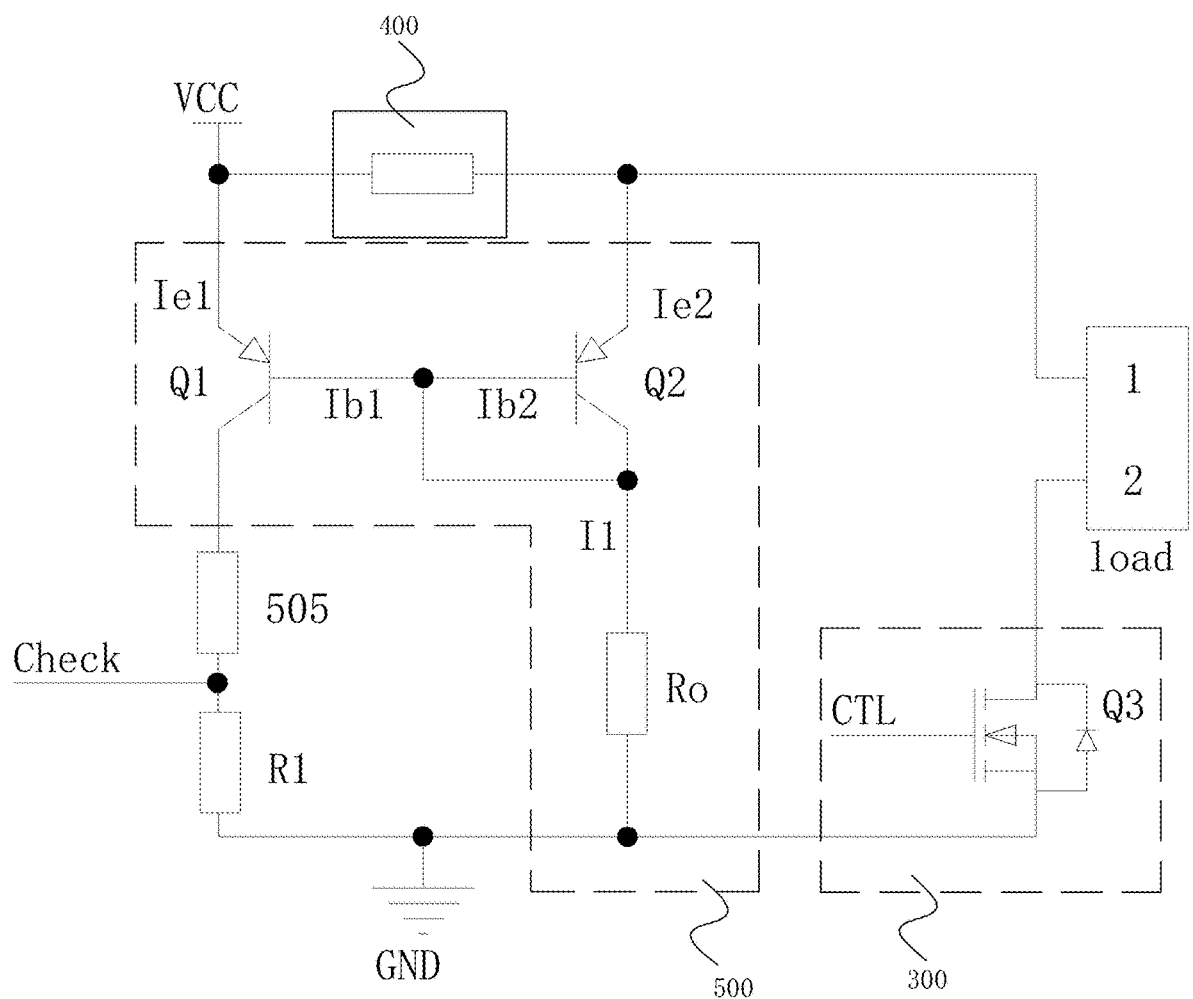
FIG. 6 is a schematic diagram of a load short circuit protection circuit of the LED power supply in embodiment 1 with second resistor.
Figure 7:
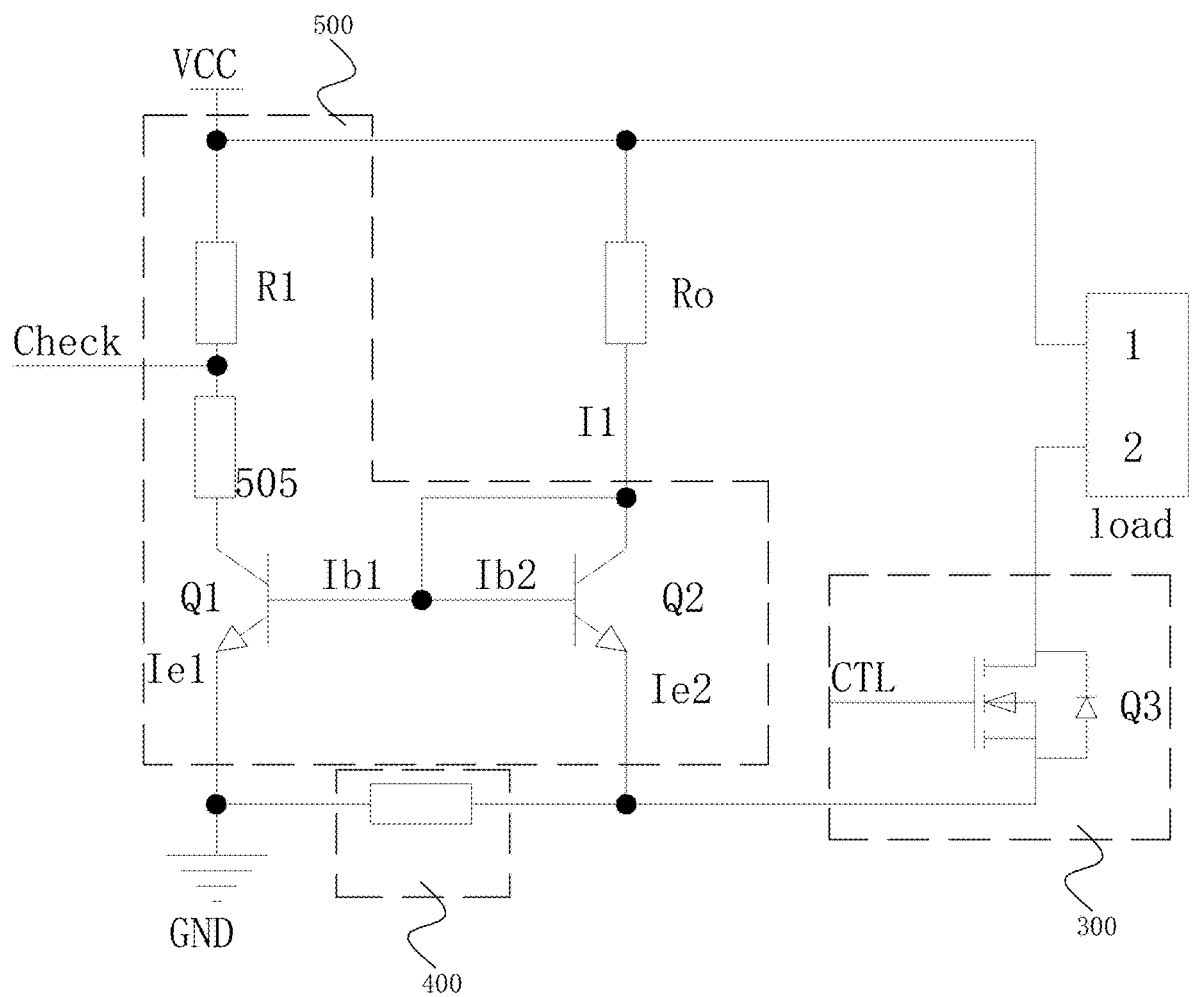
FIG. 7 is a schematic diagram of a load short circuit protection circuit of the LED power supply in embodiment 2 with second resistor.

When the protection control module 600 employs a microcontroller, the collector of the first triode Q1 is connected to a second resistor 505, the negative electrode of the second resistor 505 serves as the signal output end to connect the protection control module 600, which can play a role in protecting the microcontroller, as shown in FIG. 6 and FIG. 7.

In the load short circuit protection circuit of the LED power supply of the present embodiment, the subtle dropout voltage change of the sample resistance 400 may be quickly amplified and then output to the detection port, that is, the signal output end, shown in the figure as the Check end. Therefore, the sampling resistor having a small resistance can be selected, which can reduce the loss, in the application of LED power supply, the resistance value of the sampling resistor 400 of the present embodiment can be less than 100 mΩ, or even less than 10 mΩ. Because the device is simple, so the corresponding speed is very fast, and the cost is low, and the stability is high. The principle is explained as follows:

When Q3 is off, then the current flowing through the sample resistor 400 I=0, as to Q1, Q2, Veb1=Veb2, the base current Ib1=Ib2, then there is a current relationship:

$$Ie1=\beta Ib1=Ie2=\beta Ib2; \quad (1)$$

$$I1=Ib1+Ib2+Ie2=(\beta+2)Ib2; \quad (2)$$

When Q3 is turned on, the current flows through the sample resistor 400, the voltage V across the sample resistor 400, then Veb1=(Veb2 +V); Because Veb2 decreases, Ib2 decreases. It is assumed that the decreasing current of Ib2 is Δi, at this point, Ib1 becomes Ib1', Ib2 becomes Ib2', Ie2 becomes Ie2', Ie1 becomes Ie1', because I1 is a constant value, the current value of I1 is unchanged, so it is obtained:

$$I=Ib1'+Ib2'+Ie2'=Ib1'+(\beta+1)Ib2'=Ib1'+(\beta+1)(Ib2-\Delta i); \quad (3)$$

Substitution now yields, according to the above formula (2):

$$I1=Ib1'+(\beta+1)(I1/(\beta+2)-\Delta\Delta i); \quad (4)$$

which further substitutes into:

$$Ie1'=\beta Ib1'=\beta(I1-(\beta+1)*I1/(\beta+2)+(\beta+1)*\Delta i)=\beta*I1/(\beta+2)+\beta(\beta+1)\Delta i; \quad (5)$$

Since β is much greater than 1, Eq. 5 can be approximated as:

$$Ie1'\approx I1+\beta*\beta*\Delta i. \quad (6)$$

Figure 5:
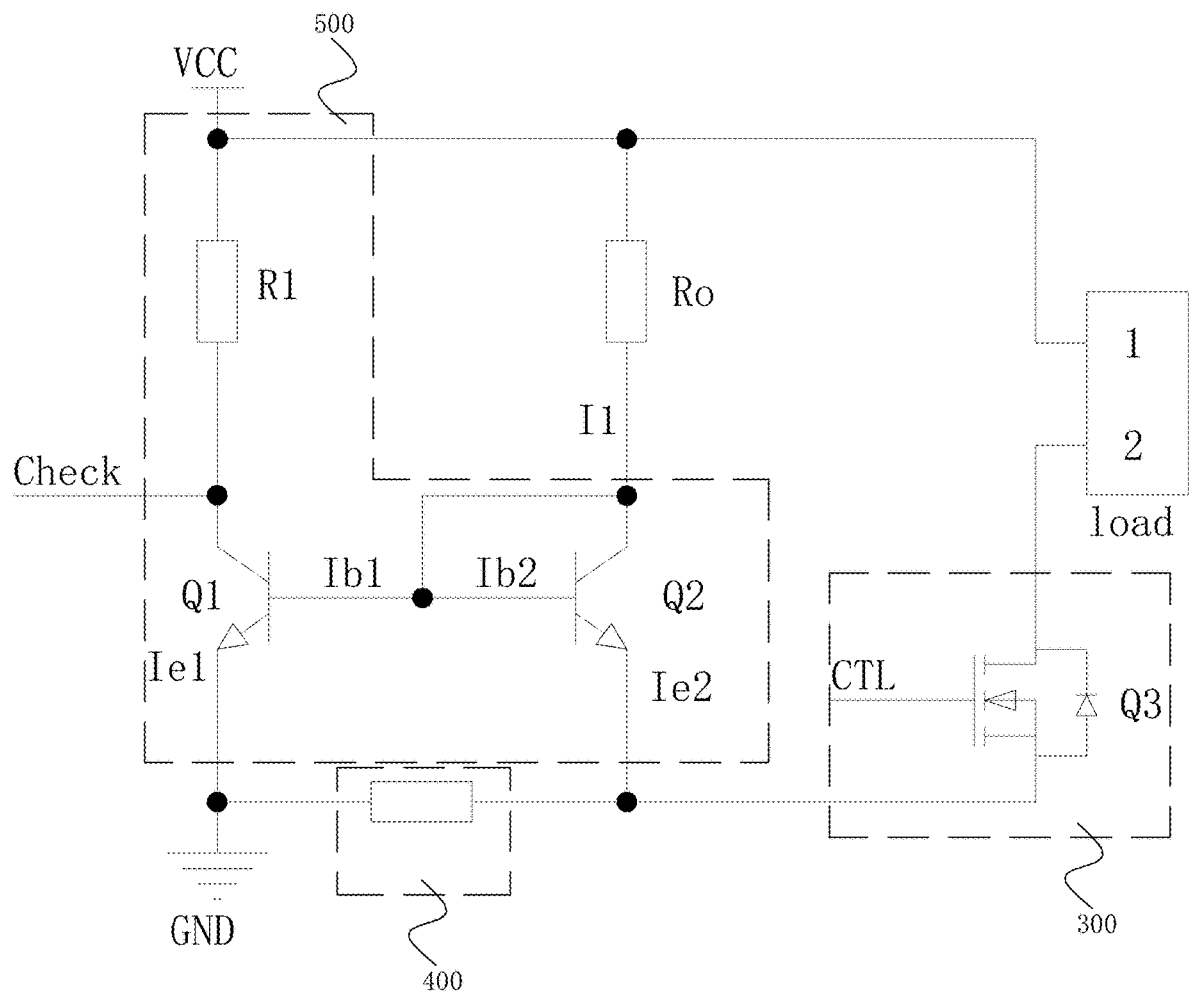
FIG. 5 is a schematic diagram of a load short circuit protection circuit of the LED power supply in embodiment 2.

In another embodiment, as shown in FIG. 5 and FIG. 7, the signal amplification module 500 includes a first triode Q1, a second triode Q2 and a constant current source Ro, and when the sampling resistor 400 is disposed at the lower end of the circuit, the first triode Q1 and the second triode Q2 employ an NPN type triode; The base of the first triode Q1 is connected to the base of the second triode Q2, the collector is connected to the negative electrode of the sampling resistor 400, the emitter is connected with the protection control module 600 as the signal output end, the emitter is also connected to the negative electrode of the conversion resistor R1, the positive electrode of the conversion resistor R1 is connected to the power supply end 100;

The collector of the second triode Q2 is connected to the positive electrode of the sampling resistor 400, the emitter is connected to the negative electrode of the constant current source Ro, the positive electrode of the constant current source Ro is connected to the power supply end 100. The way to achieve short circuit protection is the same as in embodiment 1.

In addition, the sampling resistor 400 can also be disposed between the switch module 300 and the load end 200.

The above are only preferred embodiments of the present invention, and are not used to limit the protection scope of the present invention. Any modification, equivalent replacement or improvement within the spirit of the present invention is covered by the scope of the claims of the present invention.

What is claimed is:

1. A load short-circuit protection circuit of LED power supply comprising a power supply end (100), a load end (200), a switching module (300) disposed between the power supply end (100) and the load end (200), a sampling resistor (400) set in series with the load end (200), a signal amplification module (500) that collects the current change signal of the sample resistor (400), and a protection control module (600) that receives an amplification signal of the signal amplification module (500) and controls the on-off of the switching module (300) according to the signal;

wherein the signal amplification module (500) comprises a first triode (Q1), a second triode (Q2) and a constant current source (Ro), and when the sampling resistor (400) is disposed at the upper end of the circuit, the first triode (Q1) and the second triode (Q2) employ a PNP type triode;

the base of the first triode (Q1) is connected to the base of the second triode (Q2), the emitter of the first triode (Q1) is connected to the positive electrode of the sampling resistor (400), the collector of the first triode (Q1) is connected with the protection control module (600) as a signal output end, the collector of the first triode (Q1) is also connected to the positive electrode of the first resistor (R1), and the negative electrode of the first resistor (R1) is grounded;

the emitter of the second triode (Q2) is connected to the negative electrode of the sampling resistance (400), the collector is connected to the positive electrode of the constant current source (Ro), the negative electrode of the constant current source (Ro) is grounded.

2. The load short-circuit protection circuit of LED power supply as claimed in claim 1, wherein the collector of the first triode (Q1) is connected to a second resistor (505), a negative electrode of the second resistor (505) serves as a signal output end to connect the protection control module (600).

3. A load short-circuit protection circuit of LED power supply comprising a power supply end (100), a load end (200), a switching module (300) disposed between the power supply end (100) and the load end (200), a sampling resistor (400) set in series with the load end (200), a signal amplification module (500) that collects the current change signal of the sample resistor (400), and a protection control module (600) that receives an amplification signal of the signal amplification module (500) and controls the on-off of the switching module (300) according to the signal;

wherein the signal amplification module (500) comprises a first triode (Q1), a second triode (Q2) and a constant current source (Ro), and when the sampling resistor (400) is disposed at the lower end of the circuit, the first triode (Q1) and the second triode (Q2) employ an NPN type triode;

the base of the first triode (Q1) is connected to the base of the second triode (Q2), the collector of the first triode (Q1) is connected to the negative electrode of the sampling resistor (400), the emitter of the first triode (Q1) is connected with the protection control module (600) as a signal output end, and the emitter is also connected to a negative electrode of a conversion resistor (R1), a positive electrode of the conversion resistor (R1) is connected to the power supply end (100);

the collector of the second triode (Q2) is connected to the positive electrode of the sampling resistor (400), the emitter is connected to the negative electrode of the constant current source (Ro), and the positive electrode of the constant current source (Ro) is connected to the power supply end (100).

* * * * *